Sept. 26, 1939.  L. MYERS  2,174,388
DISPENSING DEVICE
Original Filed March 14, 1936
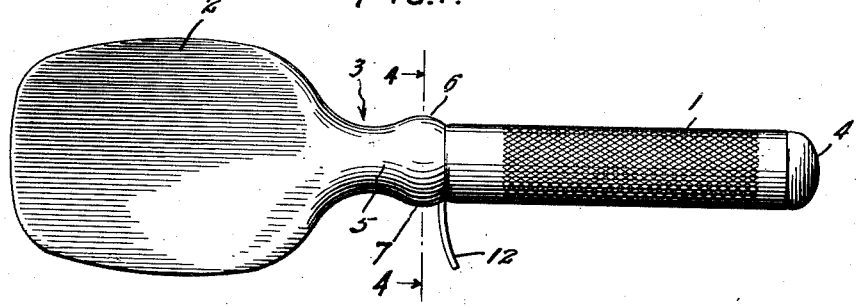
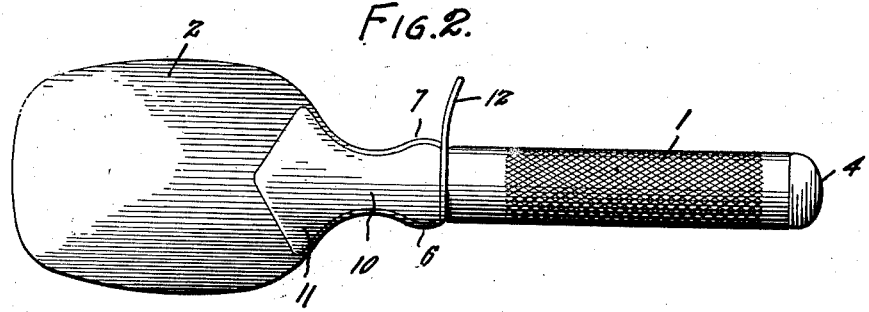
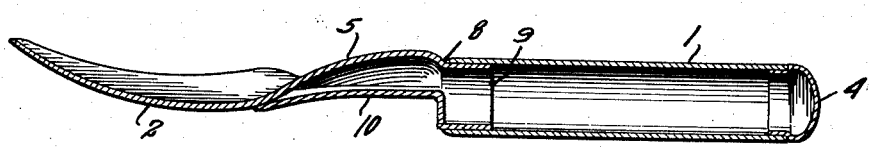
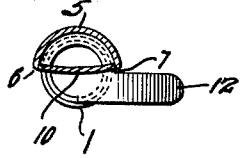
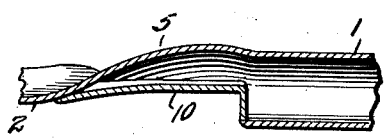
Inventor
LOUIS MYERS
By Merrill M. Blackburn
Attorney Patented Sept. 26, 1939

2,174,388

UNITED STATES PATENT OFFICE 2,174,388

DISPENSING DEVICE

Louis Myers, Galesburg, Ill.

Application March 14, 1936, Serial No. 68,857
Renewed February 13, 1939

3 Claims. (Cl. 30—328)

The present invention relates to dispensing devices, and more especially to a dishing ladle of the type employed in dispensing ice creams and like semi-solid substances.

Most ladling devices, particularly for dispensing ice creams and the like, have had many objectionable features. As ice creams are now frozen to a greater degree of hardness than heretofore, the ladles are subjected to greater strain, and are often distorted or broken between the handle and the bowl. In order to overcome this weakness, some ladles have been reinforced at this point to such a degree as to make them very heavy. Such reinforcing not only increases the cost of manufacture but makes the ladle cumbersome and awkward to handle. On the other hand, ladles which were not sufficiently reinforced between the handle and the bowl were often damaged or broken within a short time. Furthermore, prior devices have not been furnished with means for forcing the same into the ice creams, particularly when the latter are frozen relatively hard.

Among the objects of this invention are to overcome the difficulties now encountered in dispensing devices; to provide a dispensing device that can be easily and cheaply manufactured; to provide a dispensing device which is simple, efficient, and durable, both in construction and operation; to provide a dispensing device which is suitably reinforced between the handle and the bowl; to provide an ice cream dispensing device in which the weight is mainly disposed in the bowl and in which there is provided adequate means for forcing the device into the ice cream; and such further objects, advantages, and capabilities as will hereafter appear and as are inherent in the construction disclosed herein. My invention further resides in the combination, construction, and arrangement of parts illustrated in the accompanying drawing and, while I have shown therein what is now considered the preferred embodiment of this invention, I desire the same to be understood as illustrative only and not to be interpreted in a limiting sense.

In the drawing annexed hereto and forming a part hereof,

Fig. 1 represents a top plan view of my dispensing device;

Fig. 2 represents a bottom plan view of my dispensing device;

Fig. 3 represents a longitudinal section of my device;

Fig. 4 represents a view taken along the line 4—4, Fig. 1, looking in the direction of the arrows;

Fig. 5 represents a view of a modified form of my device.

Reference will now be made in greater detail to the annexed drawing for a more complete disclosure of this invention. This dispensing device consists, primarily, of a hollow, tube-like handle 1 and a bowl or spade-like member 2 which is provided with a reduced bridging member 3. The end of the bridging member 3 is adapted to fit within one of the open ends of the handle 1 and will be described in more detail hereinafter. The other open end of the handle 1 is closed by means of a suitable closure cap 4.

Referring to Figs. 1 and 3, it can be seen that the bridging member 3 of the bowl 2 extends upwardly, as indicated at 5, and outwardly, as indicated at 6 and 7, thereby forming protuberances or the like. The protuberance 6 is adapted to be engaged by the thumb of the operator to aid in using the device. The bridging member 3 then slopes downwardly, as shown at 8, and terminates in a substantially cylindrical member 9 which is of such a diameter as to fit tightly within the inner periphery of the hollow handle 1.

As best shown in Figs. 2 and 3, a reinforcing element 10 of slightly less width than the bridging member 3 spans the lower edges of the bridging member and is secured thereto by some suitable method, such as soldering, brazing, or welding. Referring to Fig. 2, it can be seen that the portion of the reinforcing element 10 which is secured to the lower face of the bowl-like member 2, as shown at 11, is preferably of greater width than that portion secured to the bridging member and is of substantially the same configuration as the contour of the bowl and, in effect, merges into the bowl. Such a construction not only preserves the appearance of the bowl but also increases the area of the bowl which is reinforced without constituting a protuberance on the bowl. The provision of such a reinforcing element on the under surface of the bridging element and bowl greatly strengthens the same against distortion or breaking without materially increasing the weight. Due to the manner in which the reinforcement is secured to the bridging portion of the bowl, no water can enter the interior of the device, and any rusting of the parts is thereby prevented. The reinforcement is so secured to the bridging member and the bowl that the ladle is readily and easily cleaned.

The reinforcing element 10 is also provided with a projection or the like 12 which is upstruck from the body of the reinforcing element. This projection 12 is adapted to fit snugly against the end of the handle 1 and is secured thereto by any suitable method. The projection 12 is adapted to be used in conjunction with the protuberance 6 for forcing the bowl into the substance to be dispensed. Having the projection 12 oppositely disposed to the protuberance 6 decidedly increases the ease with which the ladle may be used.

It will be noted from the foregoing that the bowl 2 and the bridging member 3 are formed from one piece of metal or other suitable material, the reinforcing member 10 from another, the handle from still another, and finally the closure 4 from yet another piece. In lieu of such a construction, the bowl, the bridging element, and the handle may be formed integrally. In such event, I strike from a single sheet a piece having the necessary configuration to form such elements, and then roll the same into the finished shape. The seam in the handle is then welded or secured in some other suitable manner, and finally the closure 4 is inserted into the handle and the reinforcing member welded to the lower face of the bridging element. This method of forming the spoon is, of course, more economical than making up the article in separate elements and affords an equally effective spoon. It is to be understood, however, that I do not limit myself to any specific method.

This dispensing device is used in the following manner. The handle is grasped by the hand of the operator, with the thumb resting on the protuberance 6 and the index finger engaging the projection 12, and the device is then forced into the substance to be dispensed.

From the foregoing description, it will be appreciated that I have provided a device which can be easily and cheaply manufactured, which is sufficiently reinforced to prevent any distortion or breaking, which is provided with means whereby the device may be easily forced into the substance to be dispensed, and which is quite sanitary in view of the ease with which it may be cleaned.

While I have shown and described the preferred embodiment of my invention, it will of course be understood that I do not confine myself to the precise details of construction set forth herein, by way of illustration, as it is apparent that many changes and variations may be made therein by those skilled in the art without departing from the spirit of this invention or exceeding the scope of the appended claims.

Having now described my invention, I claim:

1. A dispensing device including a handle, a bowl, and means intermediate the handle and bowl to aid in forcing the bowl into the substance to be dispensed, said means comprising a part bent laterally at approximately a right angle to the handle.

2. A dispensing device including a hollow handle, a bowl having a reduced portion extending into the handle, reinforcing means provided on the reduced portion and bridging the space between the handle and bowl, and means integral with the reinforcing means and extending therefrom at approximately a right angle to aid in forcing the bowl into the substance to be dispensed.

3. A dispensing device including a handle provided at one end with an opening and a bowl having a reduced portion extending into the opening, said reduced portion being provided with a protuberance, reinforcing means secured to the lower face of the reduced portion and to the bowl, and a projection integrally formed with the reinforcing means.

LOUIS MYERS.